United States Patent [19]
Glöggler et al.

[11] 3,986,481
[45] Oct. 19, 1976

[54] CATTLE STALLS

[76] Inventors: Martin Glöggler, Memelstrasse 34, 7910 Neu-Ulm; Friedrich Ulrich, No. 63, 8861 Durrenzimmern, both of Germany

[22] Filed: Jan. 7, 1975
(Under Rule 47)

[21] Appl. No.: 539,046

[30] Foreign Application Priority Data
Jan. 7, 1974 Germany............................ 2400552

[52] U.S. Cl. ................................................. 119/27
[51] Int. Cl.² ........................................... A01K 1/00
[58] Field of Search .............. 119/27, 14.03, 11, 96, 119/155

[56] References Cited
UNITED STATES PATENTS
1,996,196 4/1935 Ferris.............................. 119/27 X
3,734,059 5/1973 Rodrigues............................ 119/27

*Primary Examiner*—J. N. Eskovitz
*Attorney, Agent, or Firm*—Joseph A. Geiger

[57] ABSTRACT

A cattle stall construction comprising a row of parallel, regularly spaced rails into which are optionally engageable short or long C-frames, or a subassembly of two oppositely pivotable C-frames which are releasably lockable in various spaced-apart positions for the creation of a secured working space between adjacent stalls.

11 Claims, 5 Drawing Figures

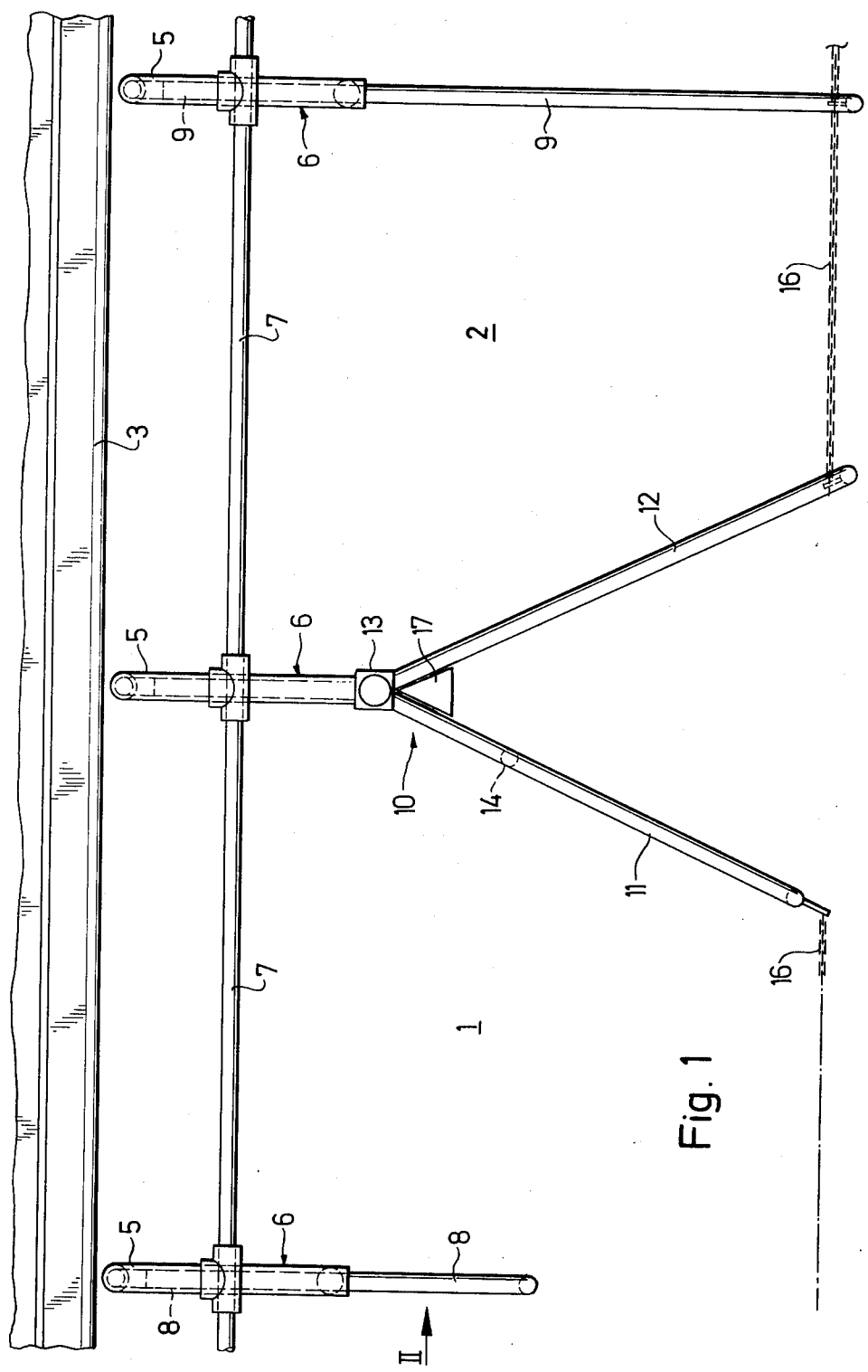

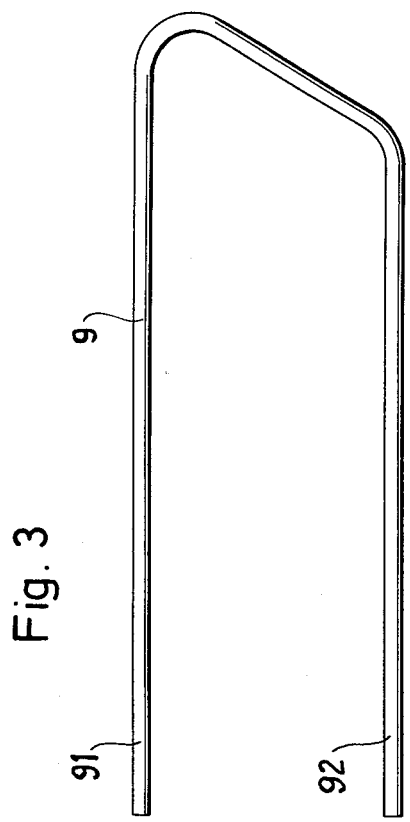
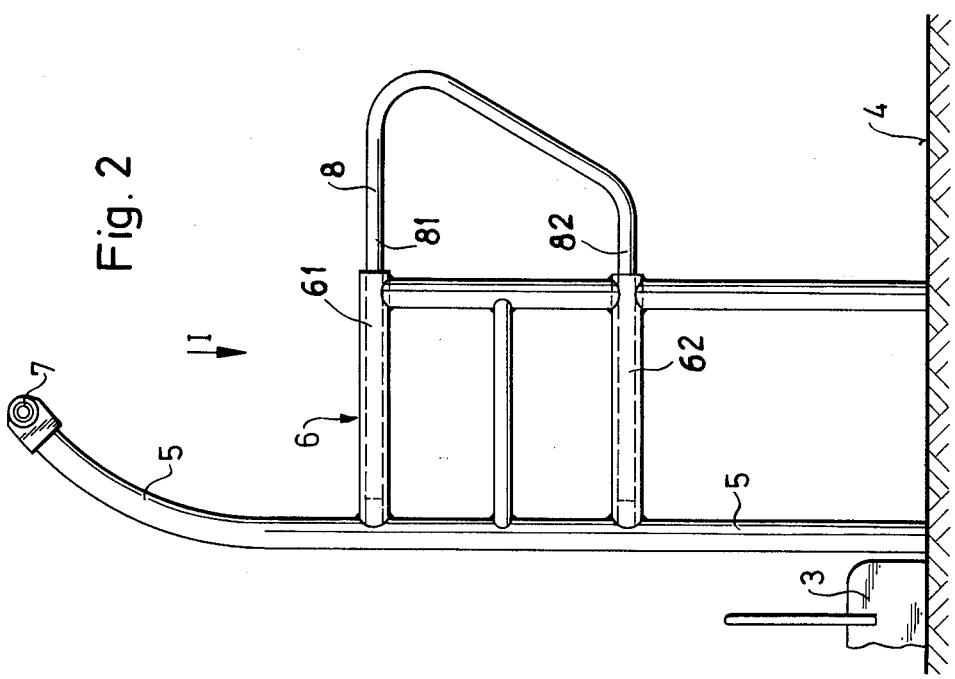

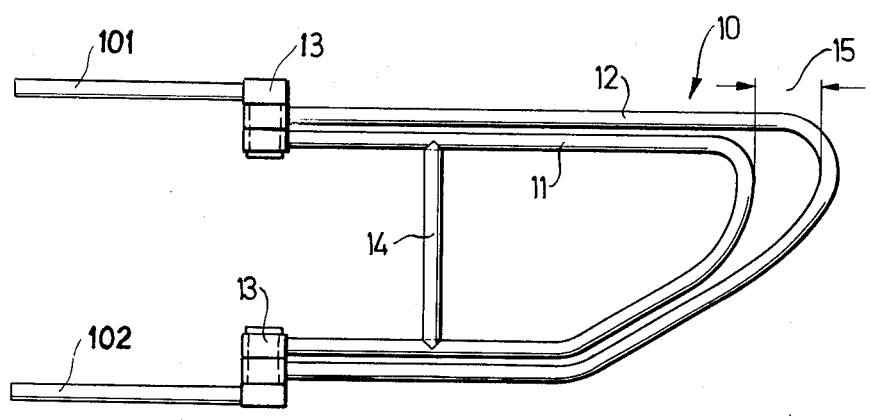

CATTLE STALLS

BACKGROUND OF THE INVENTION

1. Field of the Invention

The present invention relates to cattle stalls, and in particular to row-type cattle stalls for dairy cattle, to which the latter are confinable.

2. Description of the Prior Art

Structures for row-type cattle stalls are known from the prior art. Among them are tubular cattle stalls which include a series of uprights, anchored in the floor and linked together on their upper ends by horizontal head pipes to which a releasable tie noose may be attached, for example.

Also known are cattle stalls of this type which have dividing rails extending rearwardly from the uprights and catch frames pivotally attached to the dividing rails.

In each case, however, a person attending to the animals has no protected work space between two animals occupying adjacent stalls. This shortcoming is particularly problematic during milking operations, or when an animal is to be examined or treated by a veterinarian, in the absence of a special examination stall or other treatment installation. For this reason, milking personnel generally prefer to move the animals to special milking stalls, where they can safely operate the milking equipment.

SUMMARY OF THE INVENTION

Underlying the present invention is the primary objective of providing improved cattle stalls in which the aforementioned shortcomings are eliminated. For this purpose the present invention suggests a novel cattle stall construction in which the rearwardly extending dividing rails between individual stalls include means for securing an intermediate work space between adjacent stalls, by suggesting the provision of movable spreader members in conjunction with the dividing rails, the intermediate work space being created by the movement in opposite directions of two articulated spreader members.

The spreader assembly of the present invention is preferably constituted by two overlapping C-frames that are hinged to a short rail, so as to form a rearward extension of the latter in their normal position. These C-frames can be swung sideways from their center position, thereby reducing the available space in the adjacent cattle stalls and creating a wedge-shaped, fully secured intermediate work space for attending personnel, when the animals are to be milked, or otherwise examined or treated. For instance, a veterinarian can thus safely examine an animal up to its neck. A still further advantage afforded by the proposed novel structure resides in the fact that this arrangement makes it possible for the animals to feed while they are being milked.

Lastly, the novel cattle stall arrangement makes it possible for all but those animals which are being milked or otherwise treated to be lying down. Also, because there is no longer a necessity for the animals to be tied to their stalls during milking operations, it now becomes possible to equip these stalls with so-called catch frames and to safely perform the milking operation in these catch frame stalls, without the risks which are normally encountered in connection with conventional catch frame stalls.

In a preferred embodiment of the present invention, the stall construction provides for interchangeably attaching to the dividing rails either short or long fixed C-frames, or the pivotable C-frames of the spreader assembly, so that an animal which is being pushed away laterally by spaced apart C-frames of a spreader assembly does not hinder the next closest animal. This versatility of construction makes it possible to provide in a single row of cattle stalls a variety of different stall configurations, using tie-down devices, catch frame devices, and/or the aforementioned spreader assembly, for example.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows:

FIG. 1 represents a plan view of a partial row of cattle stalls embodying the present invention;

FIG. 2 is an end view of a cattle stall, as seen from direction II of FIG. 1, with a short C-frame;

FIG. 3 illustrates an interchangeable long C-frame;

FIG. 4 illustrates an interchangeable spreader assembly seen from the side; and

DESCRIPTION OF THE PREFERRED EMBODIMENT

Figure 5:
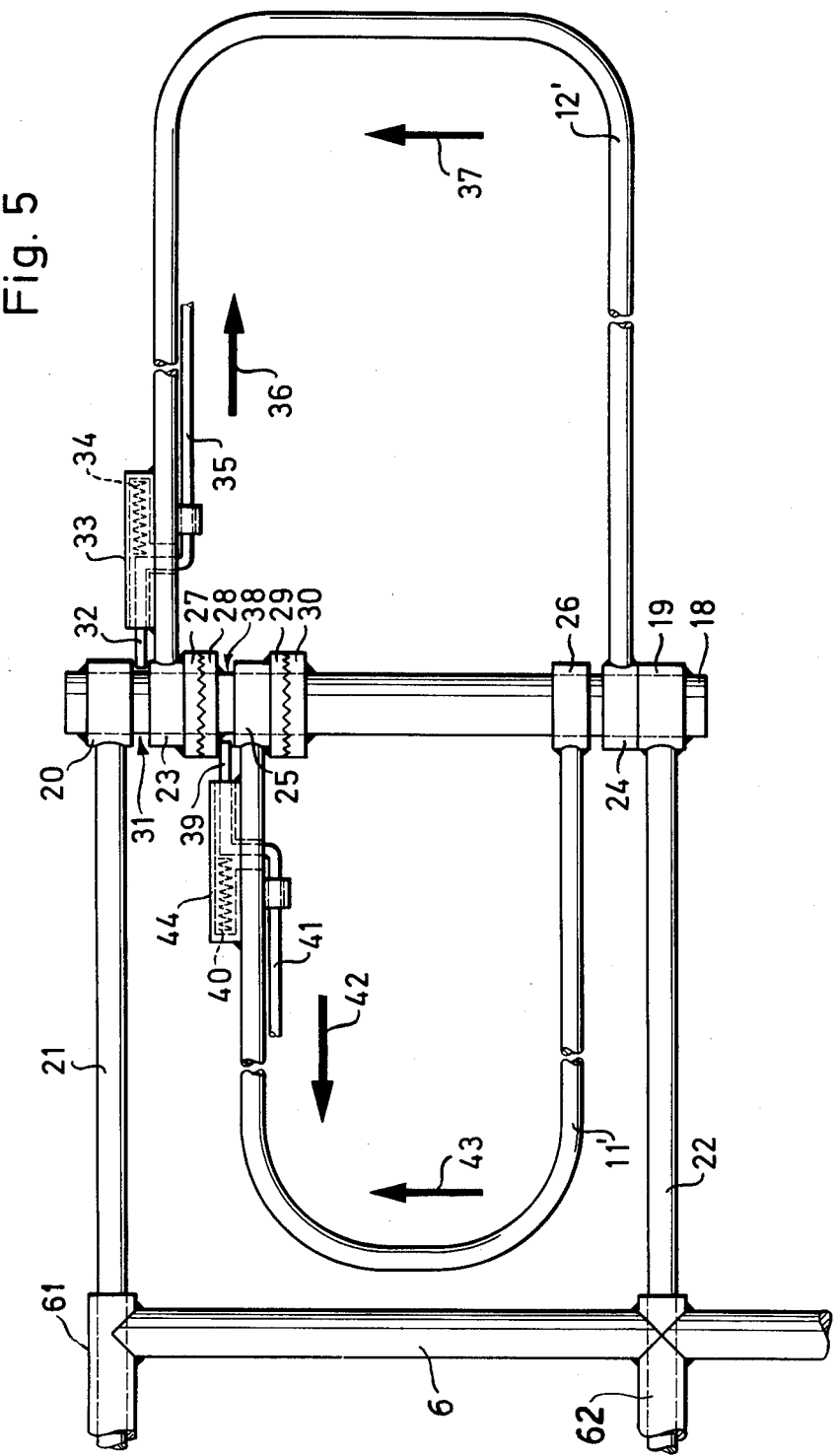
FIG. 5 illustrates at an enlarged scale, a modified version of a spreader assembly with latch means, partially disengaged from the stall rail.

As is shown in FIG. 1, the proposed cattle stall arrangement of the invention includes a row of stalls, indicated at 1 and 2, each stall being delimited in front by the trough wall 3 and by a pair of uprights 5 which are anchored in the floor 4. To each upright 5 is welded a rail 6, consisting preferably of two vertically spaced, horizontal rearwardly open pipes 61 and 62, which are suitably braced against the upright 5 and the floor 4. The upper end portions of the uprights 5 are curved rearwardly and linked together by a head pipe 7.

As is further shown in FIGS. 2 and 3, the invention provides a short C-frame 8 and a long C-frame 9, which are arranged for interchangeable attachment to the rail 6 by insertion into the pipes 61 and 62.

FIG. 4, in conjunction with FIG. 1, further shows a spreader assembly 10 which can take the place of the aforementioned C-frames and which consists of two movable overlapping C-frames, an inner C-frame 11 and an outer C-frame 12, each being pivotable about the hinge pivots 13. The pivots 13 are carried by horizontal spars 101 and 102, respectively, which spars take the place of the legs 81 and 82 of C-frame 8, or the legs 91 and 92 of C-frame 9. The inner C-frame is braced by means of a cross member 14. At the maximum curvature of the inner and outer C-frames, they are spaced apart at a radial distance 15 which makes it possible to conveniently grasp each frame with a hand, in order to swing them sideways.

In FIG. 1 is illustrated how the sideways movement of the inner and outer C-frames 11 and 12 can also be obtained with the help of chains 16, or suitable ropes, for example, which may be actuated by means of an mechanical drive, using a manual winch, a power winch, or some other suitable means, for example.

The C-frames can be maintained in their spaced apart position by inserting between them a wedge 17, as is shown in FIG. 1.

Alternatively, more sophisticated positioning means can be provided for the two movable C-frames, so that the latter are lockable in any desired angular position in relation to the dividing rail 6. Such an assembly is illustrated in FIG. 5. Here, it can be seen that both the inner C-frame 11' and the outer C-frame 12' are rotatable around a vertical pivot column 18 which is carried by upper and lower spars 21 and 22 engaged in the pipes 51 and 62 of the dividing rail 6. The spars 21 and 22 carry suitable upper and lower collars 20 and 19 which hold column 18. The outer C-frame 12' has appropriate upper and lower eyes 23 and 24 at the extremities of its legs, embracing with them the pivot column 18 for rotation thereabout. The upper eye 23, however, further includes a serrated collar 27 with which it engages a matching serrated collar 28 of the stationary pivot column 18. The comparable upper eye 25 of the inner C-frame 11' carries a similar serrated collar 29 which engages a matching fixed serrated collar 30 of column 18.

An axial gap 31 between the upper eye 23 of the outer C-frame and the upper collar 20 of the pivot column 18 allows the C-frame 12' to execute a limited axial movement, in order to allow for the disengagement of the serrated collars for movement of the outer C-frame 12'. However, this axial movement is normally blocked by a latch 32 which is engaged in the axial gap 31, the latch 32 being positioned by a latch guide 33 and by a suitable latch spring 34. An actuating rod 35, connected to latch 32 and reaching from the latch guide 33 downwardly to the upper leg of the C-frame and rearwardly alongside the latter, serves to retract the latch 32 against spring 34, when it is pulled in the direction of arrow 36. With the latch 32 thus retracted, the C-frame can be conveniently rotated, whereby the V-shaped serrations of the cooperating collars 27 and 28 lift the C-frame 12' for disengagement of the serrations and automatically re-engage each other, when the frame movement stops.

A similar axial gap 38 is provided between the upper eye 25 of the inner C-frame 11' and the fixed serrated collar 28. In this gap is normally engaged a latch 39 which, like latch 32, is arranged inside a latch guide 44 and biased by a latch spring 40. An actuating rod 41, comparable to rod 35, permits retraction of the latch 39 in the direction of arrow 42, for movement of the inner C-frame 11'.

This spreader assembly makes it possible to individually adjust each of the two C-frames into any desired angular position. Obviously, other possibilities of holding the C-frames of the spreader assembly in various open positions offer themselves as alternatives: For instance, the axially oriented serrated collars of FIG. 5 could be replaced by radially oriented serrations or cogs between which a latch is engageable. The serrations or cogs may also be replaced by a row of holes engageable by a lock pin. Or, the aforementioned indexing-type locking means may be replaced by releasable clamping means.

It should be understood, of course, that the foregoing disclosure describes only a preferred embodiment of the invention and that it is intended to cover all changes and modifications of this example of the invention which fall within the scope of the appended claims.

We claim the following:

1. A cattle stall construction adapted especially for the confinement of dairy cattle, the construction comprising:
    a row of parallel, regularly spaced frame members, interconnected and anchored to constitute a stationary structure, the frame members extending transversely to the row so as to define between them a number of adjoining cattle stalls inside which an equal number of animals are confinable side by side, at least their head movements being laterally limited by said frame members;
    two spreader members arranged between at least one pair of adjoining stalls in general alignment with the frame member separating them, the spreader members extending rearwardly therefrom over a major portion of the stall length which is normally occupied by an animal; and wherein at least one of said spreader members is adapted for lateral pivoting movements out of alignment with the frame member and with the other spreader member, so as to create an intermediate work space between the spaced apart spreader members from which the animals in the two stalls are held back by the action of the spreader members; and
    means for locking a laterally pivoted spreader member in a position pivoted away from the associated spreader member, so as to secure said intermediate work space against an unruly animal.

2. A cattle stall construction as defined in claim 1, wherein
    both spreader members are adapted for lateral pivoting movements in opposite directions relative to the associated frame member; and
    the spreader member locking means includes means for separately locking each spreader member in a pivoted position relative to the frame member.

3. A cattle stall construction as defined in claim 1, wherein
    both spreader members are pivotally connected to the associated frame member, being movable about a substantially vertical pivot axis, so as to create a wedge-shaped intermediate work space, when at least one of the two members is pivoted away from its normal, aligned position.

4. A cattle stall construction as defined in claim 3, wherein:
    the two spreader members are in the form of C-frames, having vertically spaced legs extending forwardly from a rearward bend to the point of pivotal connection with the frame member; and
    the two C-frames are unequal in size, so that the larger outer C-frame reaches around the smaller inner C-frame in their normal, aligned position.

5. A cattle stall construction as defined in claim 4, wherein
    the spreader member locking means includes a wedge adapted to be inserted between the spaced apart C-frames near their pivot connection.

6. A cattle stall construction as defined in claim 4, wherein:
    each frame member includes two vertically spaced horizontal anchoring pipes oriented rearwardly in the direction of the spreader members; and
    the two C-frames and a said pivot connection form a spreader subassembly, the connection including a hinge pivot with upper and lower spars adapted for mounting engagement in the anchoring pipes of a frame member.

7. A cattle stall construction as defined in claim 6, further comprising
at least one size of a rigid C-frame which is interchangeably mountable in the anchoring pipes, in the place of a spreader subassembly.

8. A cattle stall construction as defined in claim 6, wherein:
the hinge pivot further includes a non-rotatable pivot column extending between the upper and lower spars;
each of the two C-frames has eyes on its upper and lower legs with which it engages the pivot column for rotation thereabout; and
the locking means is adapted for locking at least one eye of each C-frame against the pivot column in any one of a plurality of possible rotational positions.

9. A cattle stall construction as defined in claim 8, wherein
the locking means between said eye of the C-frame and the non-rotatable pivot column includes on one of them a locking collar with a row of recesses and on the other a cooperating indexing member.

10. A cattle stall construction as defined in claim 9, wherein:
the locking collar is an axially serrated collar solidary with the pivot column, and the indexing member is a matchingly serrated collar solidary with said eye of the C-frame;
at least the lockable eye of each C-frame is axially movable a distance along the pivot column for disengagement of the serrated collars; and
the locking means further includes spring-biased latch means for releasably blocking said axial mobility.

11. A cattle stall construction as defined in claim 1, further comprising
traction means for mechanically moving the spreader members apart in the lateral direction.

* * * * *